United States Patent [19]

Grossi et al.

[11] Patent Number: 5,604,341
[45] Date of Patent: Feb. 18, 1997

[54] ATM AS VIDEO CONFERENCING STATION

[75] Inventors: Mark M. Grossi, Muirhead; Grant C. Paton, Dundee, both of Scotland; George E. Schneider, Springboro, Ohio

[73] Assignee: AT&T Global Information Solutions Company, Dayton, Ohio

[21] Appl. No.: 403,145

[22] Filed: Mar. 13, 1995

[51] Int. Cl.$^6$ ................................................ G06F 17/60
[52] U.S. Cl. .................. 235/379; 235/381; 348/15
[58] Field of Search .................................. 235/379, 380, 235/381; 364/408; 348/13, 14, 15; 395/200.04, 200.12

[56] References Cited

U.S. PATENT DOCUMENTS

| | | | |
|---|---|---|---|
| 3,697,693 | 10/1972 | Deschenes et al. | 364/408 |
| 4,430,526 | 2/1984 | Brown et al. | 235/472 X |
| 4,567,359 | 1/1986 | Lockwood . | |
| 4,845,636 | 7/1989 | Walker . | |
| 4,947,028 | 8/1990 | Gorog | 235/381 |
| 5,109,407 | 4/1992 | Fijita et al. | 379/105 |
| 5,193,057 | 3/1993 | Longfield | 364/408 |
| 5,220,501 | 6/1993 | Lawlor et al. | 364/408 |
| 5,231,571 | 7/1993 | D'Agostino | 364/408 |

OTHER PUBLICATIONS

Kristina B. Sullivan, "AT&T chips could lower video cost barrier", PC Week, Vl. 3674, Vl. 9, p. 19, Apr. 13, 1992.
"Teleconferencing Comes to Columbus", Akron Beacon Journal, Tuesday, Dec. 10, 1991, Edition: 1 Star, Section: Business, p. D5.
"New NCR ATMs Offer Video–Hookup Interaction", Plain Dealer (Cleveland), Tuesday, May 19, 1992, by Associated Press, Edition: First/West, Section: Business, p. 5G.
"New Automatic Teller has a Video System", San Francisco Chronicle (SF), Monday, May 18, 1992, Edition: Final, Section: Business, p C5.

*Primary Examiner*—Donald T. Hajec
*Assistant Examiner*—Jeffrey R. Filipek
*Attorney, Agent, or Firm*—Michael Chan

[57] ABSTRACT

The invention concerns using Automated Teller Machines as video conferencing stations. In a video conference, two parties can both see, and speak with, each other. The invention allows a user of an ATM to hold a video conference not only with the financial institution which operates the ATM, but with any other suitable facility, such as a personal computer, properly equipped.

5 Claims, 8 Drawing Sheets

ATM AS VIDEO CONFERENCING STATION

The invention concerns use of Automated Teller Machines (ATMs) as video conferencing stations.

BACKGROUND OF THE INVENTION

Historically, Automated Teller Machines (ATMs) have been used primarily for routine operations such as dispensing cash, making cash advances, providing account balance information, and the like. The capabilities of the machines have been limited to the routine duties of a bank teller, consistent with the designation "Automated Teller Machine."

The Applicants believe that the capabilities of the ATM can be extended by adding video conferencing. Rudimentary types of video conferencing exist in the prior art.

For example, U.S. Pat. No. 4,845,636 (Walker, 1989) describes a kiosk which is accessible to the general public, and which allows a customer to establish a video conference with the agency which owns the kiosk. In this patent, when a user actuates a telephone, a dialing system automatically establishes a telephone connection with the owner of the kiosk.

Further, this patent, at the top of column 4, states that

[The video equipment] uses ordinary telephone lines to transmit and receive "slow scan" or "still" pictures.

This type of operation does not amount to true, or even simulated, video conferencing.

U.S. Pat. No. 4,567,359 (Lockwood, 1986) discusses a station containing a video display (called a "monitor") which presents visual information to a customer about insurance policies. The customer can select and purchase a policy at the station.

This patent also discusses presentation of a video recording to the customer, using the display, wherein a recorded person gives instructions to the customer. However, no video conferencing is discussed which takes place between two real persons. According to the patent, the video recording merely "creates the impression of dealing with a live person." (Column 5, line 36.)

OBJECTS OF THE INVENTION

An object of the invention is to provide an improved ATM.

A further object of the invention is to provide an ATM which has video conferencing capabilities.

SUMMARY OF THE INVENTION

In one form of the invention, an ATM is equipped with video conferencing equipment which allows a customer to establish a video conference with an officer of a bank, or with another ATM, or with any other station equipped with compatible video conferencing equipment.

DETAILED DESCRIPTION OF THE INVENTION

Figure 1:
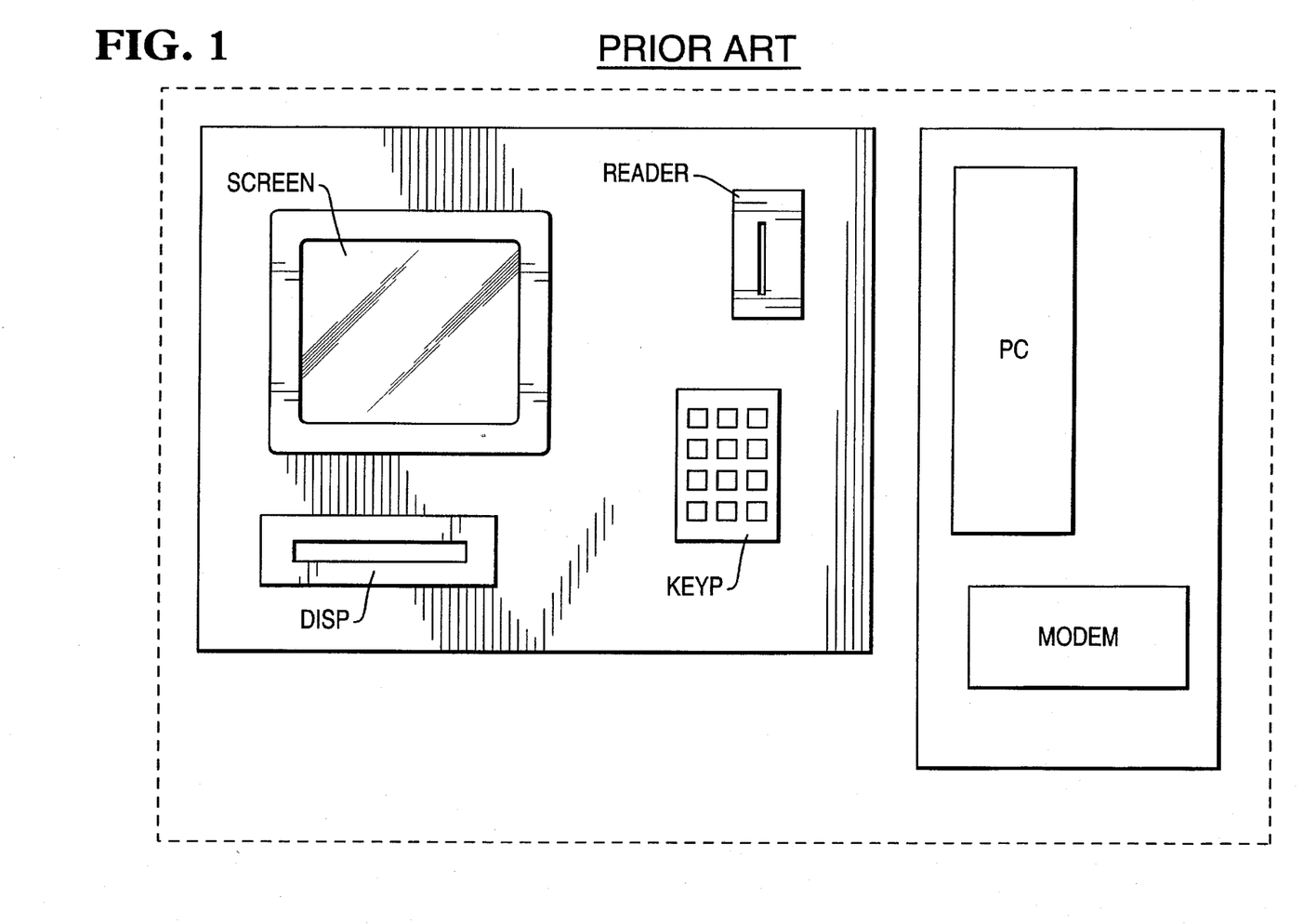
FIG. 1 illustrates selected equipment contained in a prior-art ATM.

FIG. 1 illustrates, in schematic form, some of the equipment contained in a prior-art Automated Teller Machine (ATM). The equipment includes a Personal Computer (PC) and a MODEM. The latter allows the PC to communicate with the financial institution which owns the ATM.

The equipment also includes the following:

A magnetic card READER, which reads an identification card presented by a user of the ATM.

A keypad, labeled KEYP, which allows a user to enter data.

A dispenser, labeled DISP, which dispenses currency to the customer.

A video display, labeled SCREEN, which allows the PC to display information to the customer.

Figure 2:
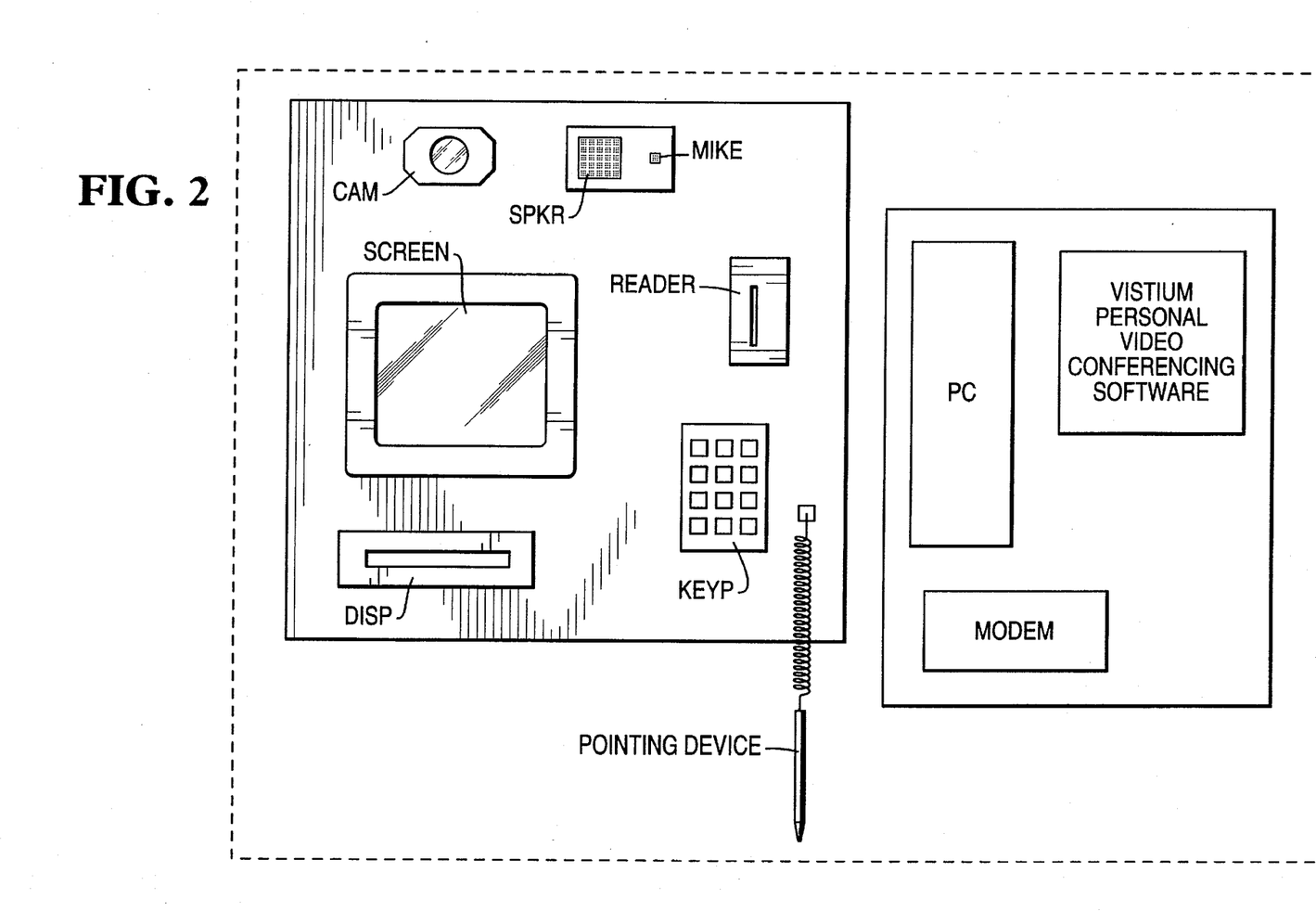
FIG. 2 illustrates equipment which can be added to the equipment of FIG. 1.

One form of the invention adds the equipment shown in FIG. 2. This added equipment includes the following:

A video camera, labeled CAM.

An audio speaker, labeled SPKR.

An audio microphone, labeled MIKE.

A POINTING DEVICE, such as a light pen, pen-type trackball, or mouse.

VISTIUM PERSONAL VIDEO CONFERENCING SOFTWARE, which is a commercially available product, which can be purchased from AT&T Global Information Solutions Company, Naperville, Ill. An early version of this product was designated "Telemedia Connection."

Figure 3:
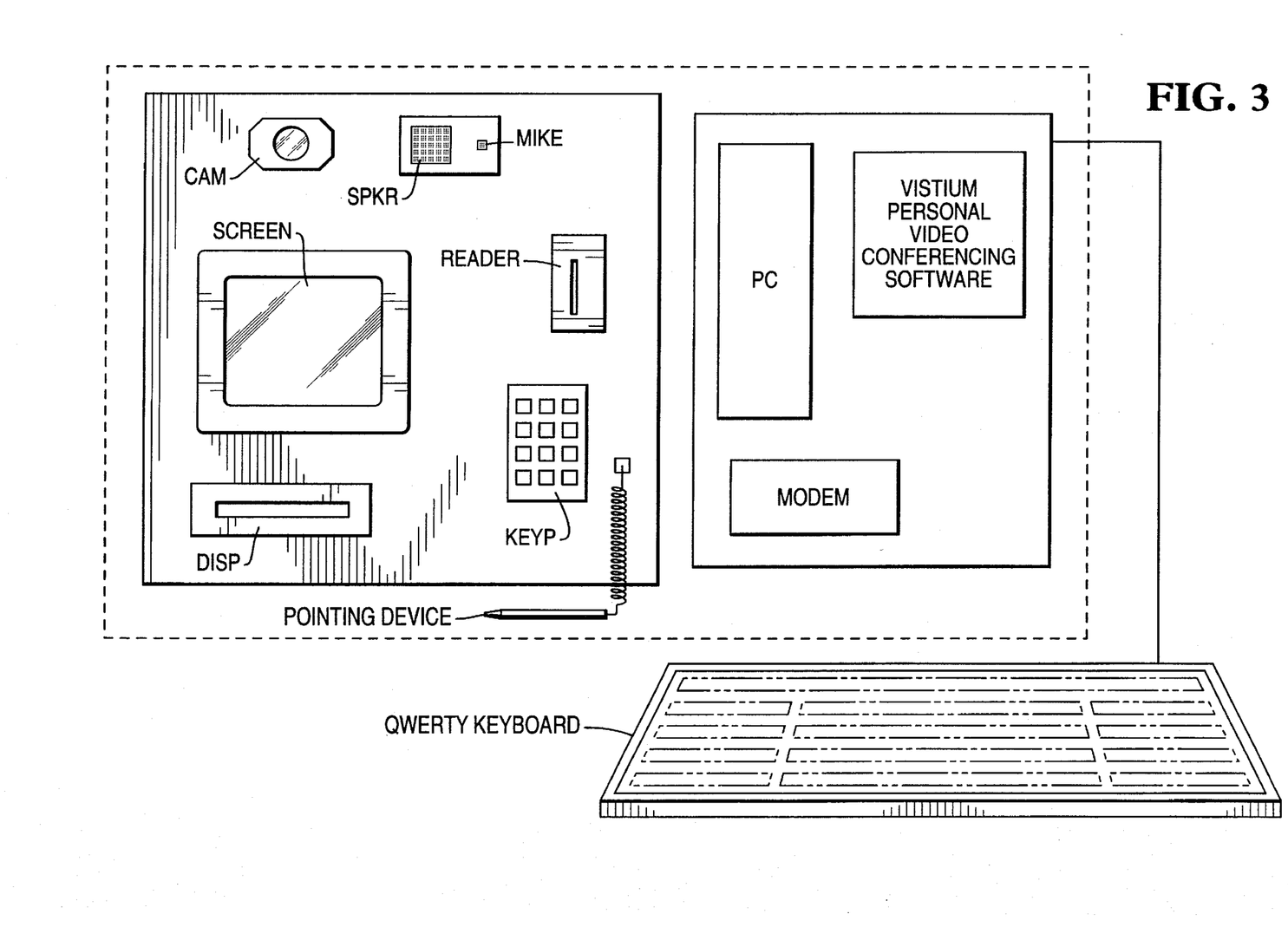
FIG. 3 repeats FIG. 2, but adds a QWERTY KEYBOARD.

A standard QWERTY KEYBOARD, as shown in FIG. 3, can be added, perhaps in replacement of the keypad KEYP.

The keypad KEYP need not be discrete component, but can be integrated into the display DISP, by using a touch-sensitive screen within the display.

Figure 4:
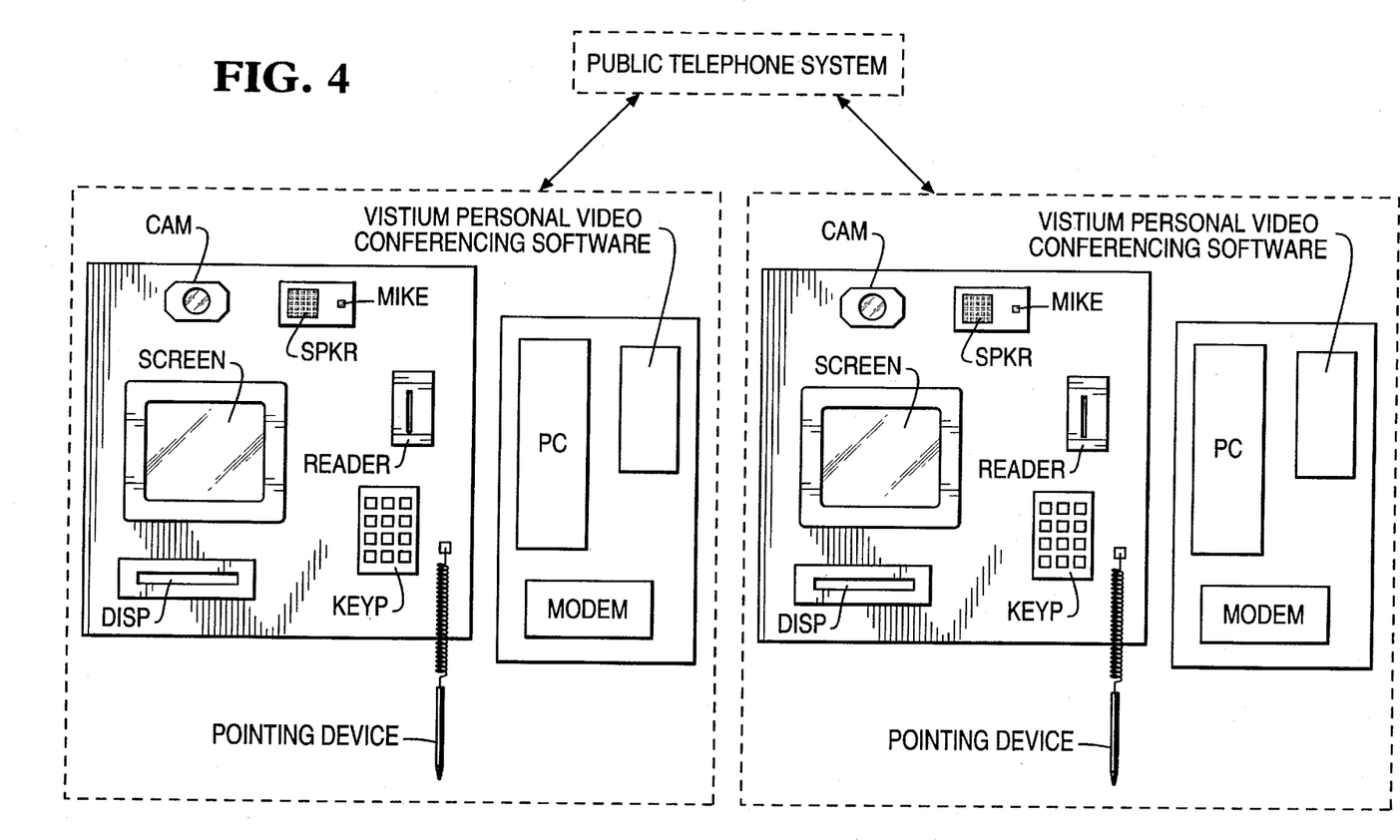
FIG. 4 illustrates two ATMs, of the type shown in FIG. 2, linked by a common-carrier telephone channel, and thereby able to undertake a video conference.
Figure 5:
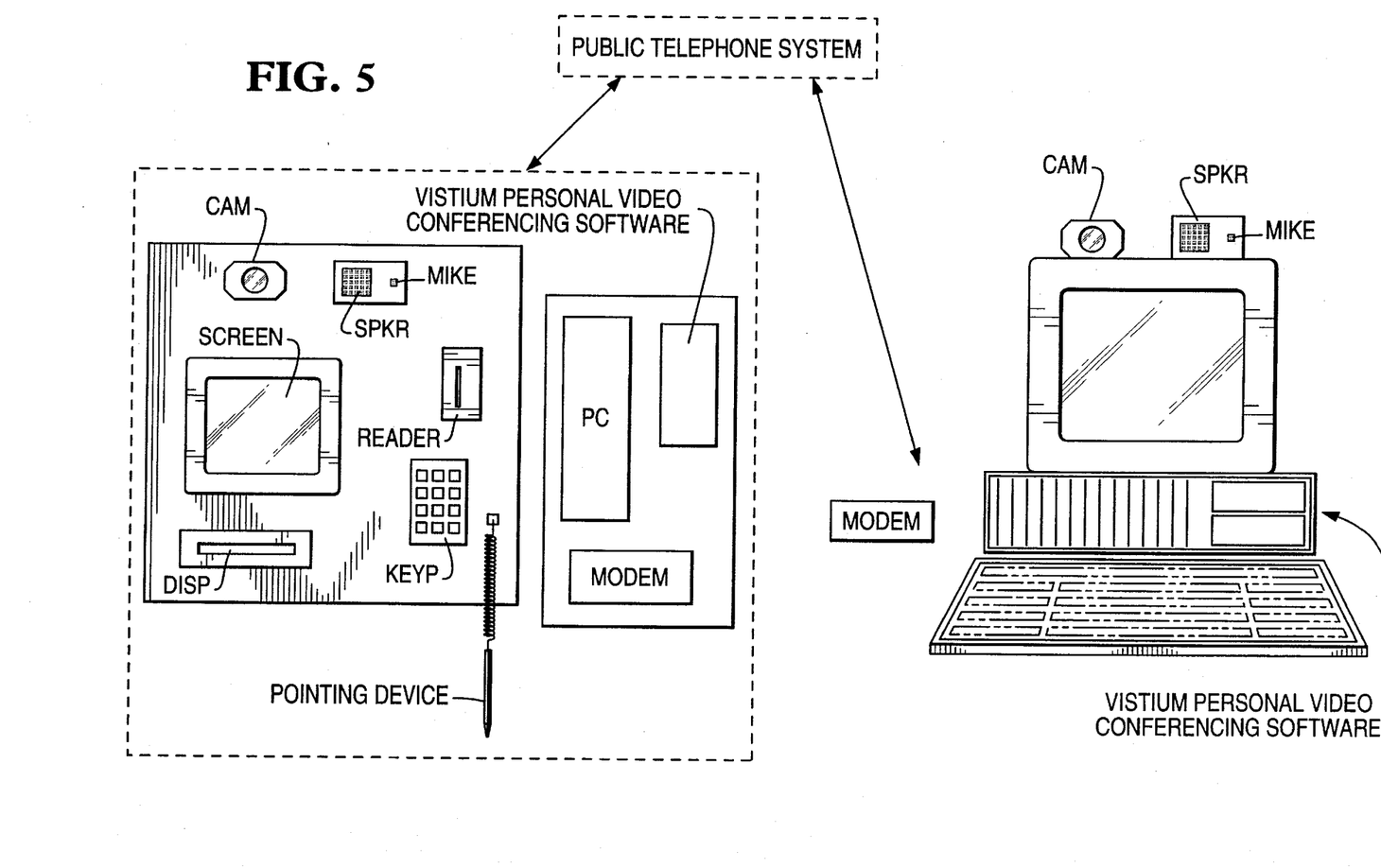
FIG. 5 is similar to FIG. 4, but with the exception that a video conference is held between an ATM and a computer which is not part of an ATM.

This equipment allows a user of the ATM to establish a video conference with another ATM, which is similarly equipped, as shown in FIG. 4. Also, as shown in FIG. 5, the equipment allows a user of the ATM to hold a video conference with any computer (and not solely with another ATM), if properly equipped, such as one located within the offices of the financial institution which owns the ATM.

(The POINTING DEVICE is, strictly, not required to establish the video conference. Also, the SPKR and MIKE can be replaced by a standard telephone handset, if desired.)

In a video conference, each party can speak to, and hear, the other, by means of the speaker SPKR and microphone MIKE in FIG. 4. Also, each party can see, on the SCREEN, the image which is captured by the camera CAM of the other party. This image can include the face of the other party, or an object, such as a document, which the other party presents to the camera CAM.

Dialing the telephone number of the other party is handled by the VISTIUM system. The ATM can be designed to dial a default number, such as that of the financial institution which owns the ATM, or to allow the customer to select the customer's own choice of number.

Loan Application via Video Conference

Figure 6:
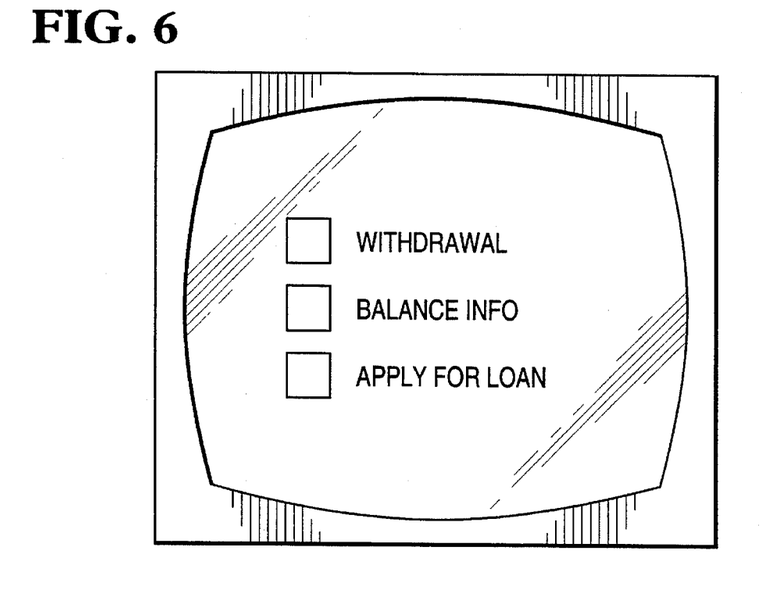
FIG. 6 illustrates a screen which the invention generates, in order to allow a customer to initiate a loan application.

After a customer logs on to the ATM, the customer selects an option which initiates a loan application procedure, possible by using the screen shown in FIG. 6. The ATM responds by establishing a video conference between the ATM and a bank officer. During initial phases of the conference, the bank officer requests information which is sufficient to run a credit check on the customer. The bank officer relays this information to another representative of the bank, who initiates a credit check of the customer.

While the credit check is being undertaken, the bank officer obtains additional information about the customer. At some time during this procedure, the credit report will have arrived. The bank officer combines the credit report with the information obtained from the customer, does credit scoring, and then gives the customer, via the video conference connection, tentative approval of the loan.

At this point, paper forms need to be completed, which are mailed to the customer for completion and return to the bank.

Automated Loan Application

A user can log on to the ATM of FIG. 2 by presenting a pass-card to the card reader READER, and typing a password on the keyboard, in the usual manner.

In a preferred embodiment, the keyboard takes the form of a touch-screen keypad, known in the art, which is presented on the display.

After the user logs on, the ATM presents a series of choices, such as those indicated in FIG. 6. All but one of the choices represent prior-art ATM functions. The one difference is the choice "APPLY FOR LOAN."

Figure 6A:
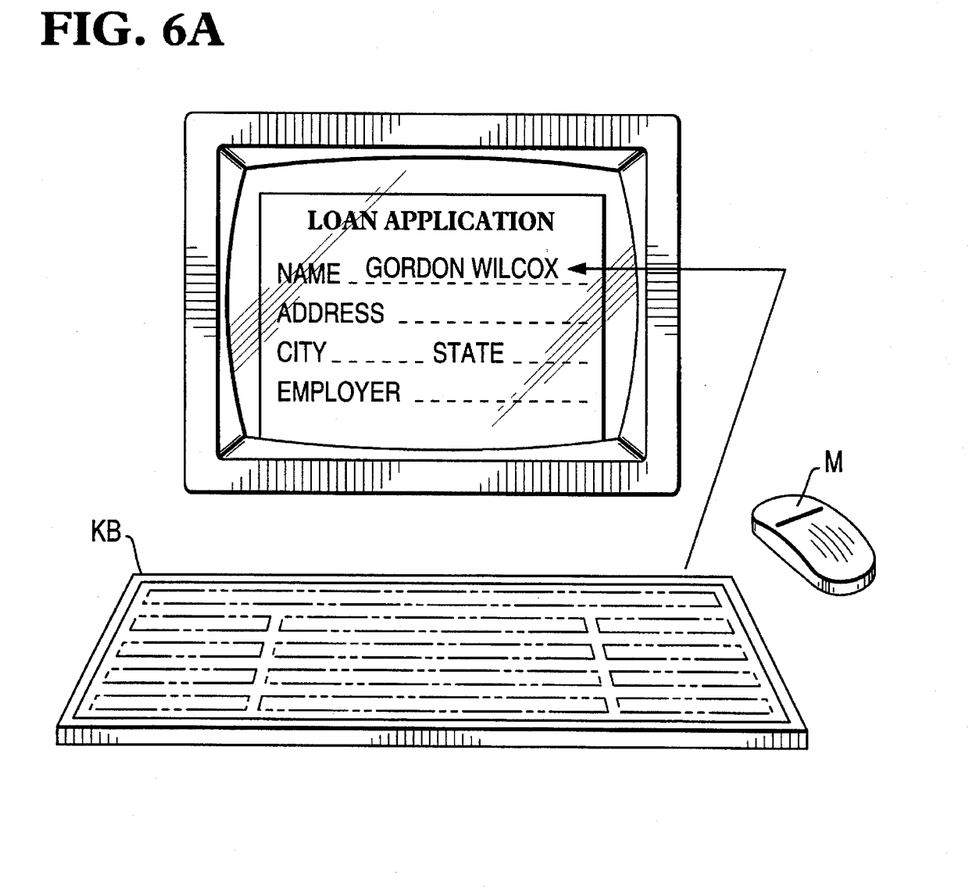
FIG. 6A illustrates a screen presented by a form-filling program.

If the customer selects this choice, the ATM presents a blank form on the display, as shown in FIG. 6A. The customer fills the blanks, by using the keyboard. The blank for is generated using the collaboration feature of the VISTIUM system, which runs a form-completion application program. Such programs are commercially available.

Invention Performs Credit Check While Customer Fills Cut Form

As the customer fills the blanks in the form, the ATM, or an associated system, such as a computer at the bank which supervises the ATM, dials up one or more credit reporting agencies, and requests credit reports on the customer. In order to obtain the credit reports, the customer must be identified in a manner understandable to the credit reporting agency, because the credit reporting agencies catalog their information according to codes such as social security numbers, rather than by customer name.

Figure 7:
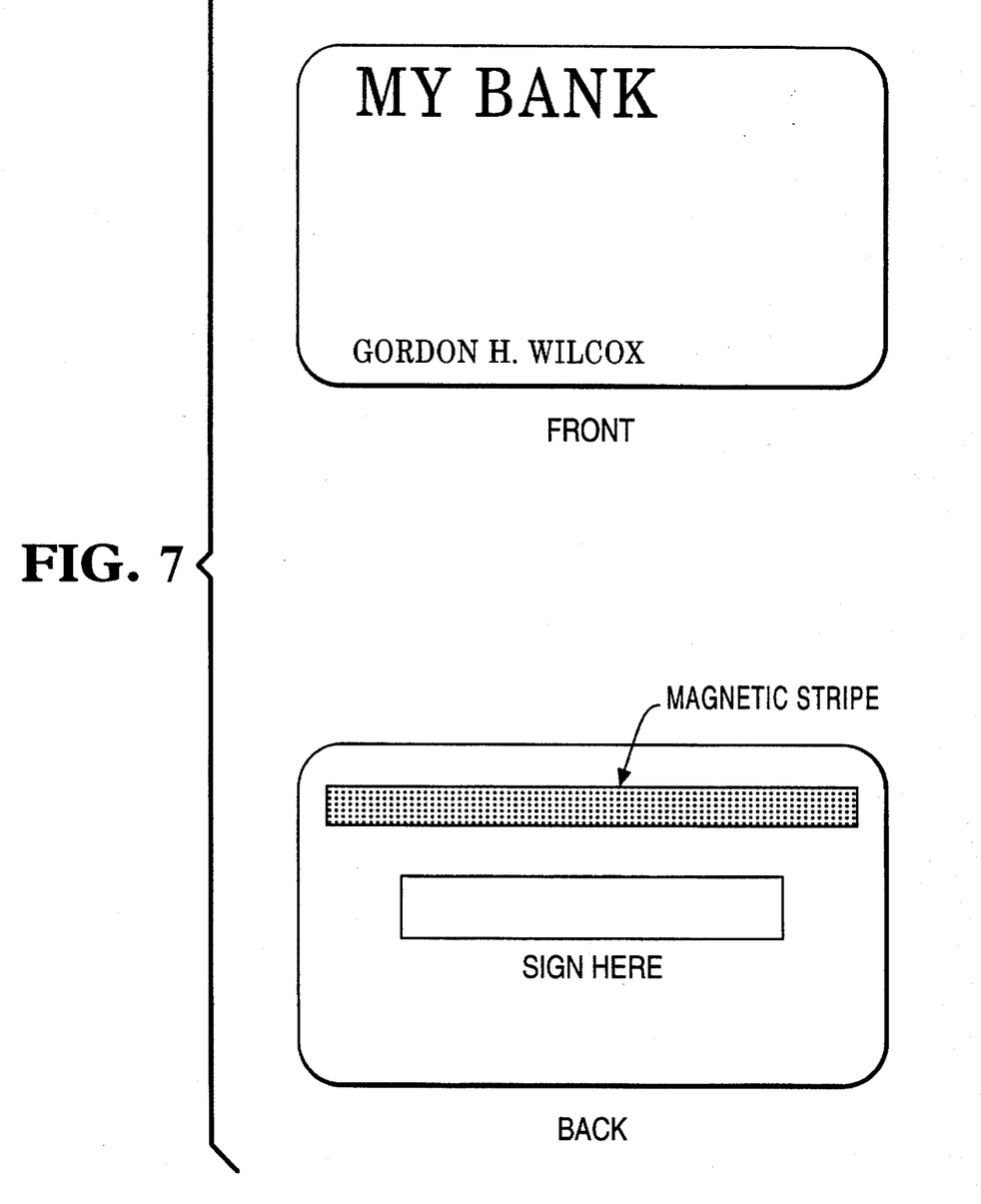
FIG. 7 illustrates the FRONT and BACK of an identification card used to log onto an ATM.

Two simple approaches to obtaining the identifying code of the customer are the following. One is to encode the identifying information onto the pass-card itself. FIG. 7 illustrates such a pass-card. The magnetic stripe of the card carries the necessary information required by a credit reporting agency.

However, not all cards presently carry such information. Further, customers may object to such information on their cards. Another approach is to maintain a table, either within the ATM or a facility to which the ATM has access, which cross-indexes the required codes with data existing on the customer's pass-card.

Figure 8:
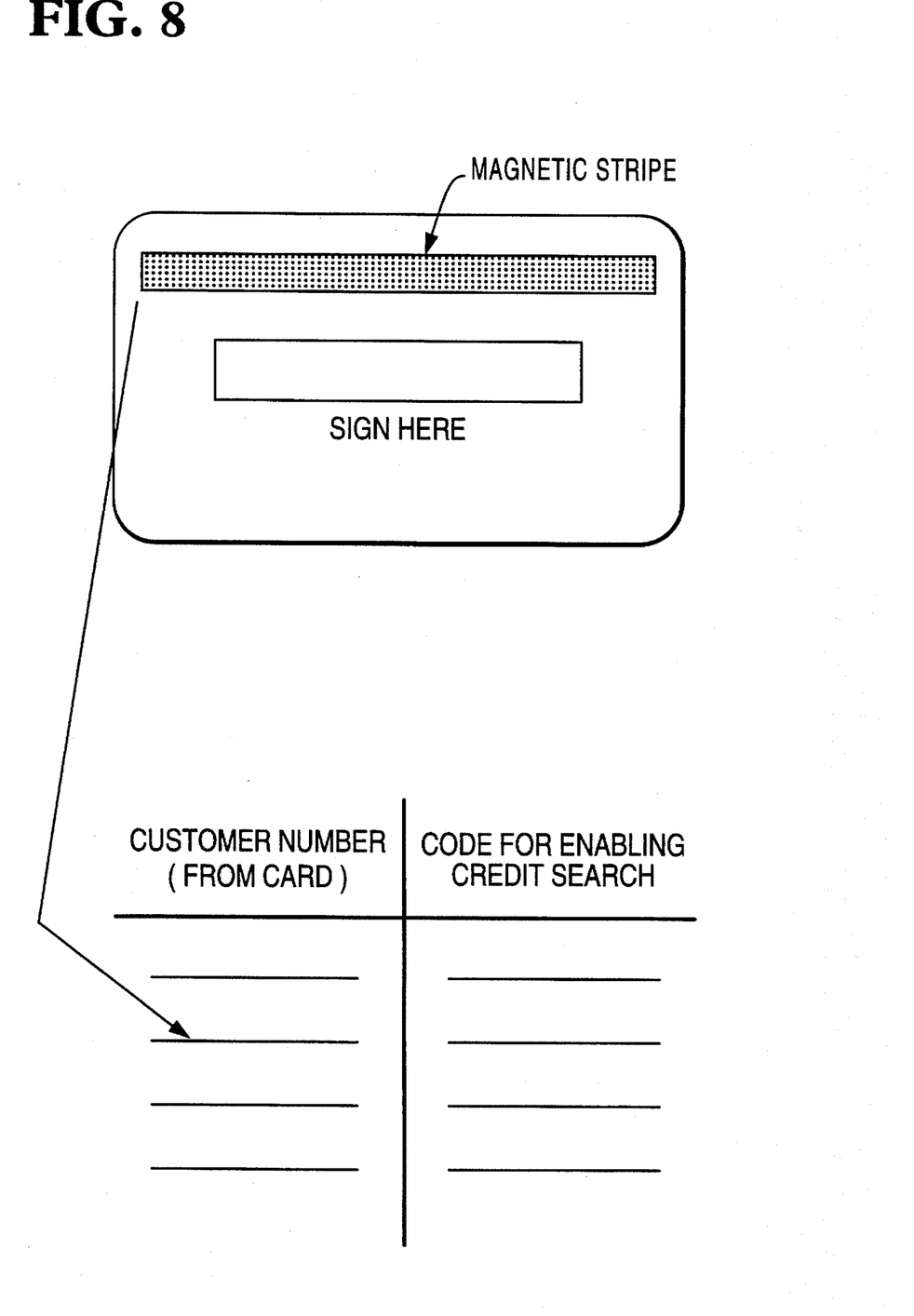
FIG. 8 illustrates how a look-up table can derive information which allows a credit search to be run, based on customer information contained on the identification card of FIG. 7.

FIG. 8 illustrates this principle. In this approach, the pass-card in FIG. 8 contains only information needed by the bank in its internal record keeping. The pass-card does not contain information which enables credit reporting to be done. To obtain a credit report, the ATM reads the pass-card and uses the table of FIG. 8 to find the data required for running a credit search.

Invention Itself Can Approve Some Loans Bank Officer Required for Others

In some cases, after the customer has completed the form, and the credit reports have been obtained, the computer system itself may approve the loan application, without intervention by a bank officer. For example, the lender may maintain a multi-tiered structure for loan approvals, some of which can be approved by the invention, and others of which require an officer's review.

Tier 1

One tier may involve small loans. The bank establishes approval criteria, and the invention ascertains whether the criteria are met, based on the application, made at the ATM, and the credit report.

As a highly simplified example, the criteria may be that, for a loan of $5,000.00, the applicant must (A) own a credit rating minimum of "B," (B) own a house, and (C) have been employed for at least two years by the same employer. If the application process, completed at the ATM, indicates that the criteria are met, then the system approves the loan, and credits the applicant's account, or issues a check for the loan amount.

Other tiers have different criteria, and may require a bank officer's intervention for approval.

Important Considerations

1. "VISTIUM" ALLOWS FORM PROGRAM TO RUN

Running the form-completion program at the ATM, and then transmitting the completed form to the lending institution can be accomplished by the commercially available product known as the VISTIUM PERSONAL VIDEO CONFERENCING SOFTWARE, discussed above.

This product provides video-conferencing capability, using standard personal computers, which are based on the x86 processor, available from Intel Corporation, Santa Clara, Calif. In addition, this product allows multiple users, running different computers, to share a computer program. Under sharing, which is also called collaboration, a single program (a) runs on one of the computers, (b) accepts input from that computer, and (c) generates an image on the display of that computer, in the usual manner.

VISTIUM replicates that display on the displays of all other computers, so that all users see a common display. Further, VISTIUM allows "collaboration," in which all users (or selected users) provide input to the program. As a result, any user can operate the program, and all users simultaneously witness the operation of the program. When a collaborative conference is finished, the final product of the collaboration, such as a document contained in a data file, can be made available to all users.

Under the invention, the form-filling program is the shared program. (However, a large amount of collaboration is not expected in general. It is expected that the bank officer will have little, or no, involvement in completing the form, and will thus not collaborate to a large extent.)

It is possible to allow the customer to complete the application without holding a video conference. After the customer completes the application, the file representing the application is transmitted to the lending institution, by VISTIUM.

2. LOAN CAN BE APPROVED WITHOUT HUMAN INTERVENTION

In one form of the invention, the loan process is fully computerized. The invention gathers information for a loan application from an applicant located at an ATM, and orders a credit report, which is delivered in computer-readable format. The invention assigns weights to various factors, such as credit rating, income, employment history, etc., and arrives at a total point score in evaluating the application.

If the point score exceeds a minimum, then the invention approves the loan, and funds are disbursed without significant review by a bank officer. (A cursory review may be undertaken to check for large errors, but this is expected to be small, in the range of five minutes maximum.)

However, the invention is not restricted to this purely automated operation. The invention can gather the required information, without human assistance, and when sufficient information is obtained, can relay the information to a loan officer for analysis. One type of sufficient information consists of the loan application, completed at the ATM, together with the required credit reports.

3. REQUESTING CASH ADVANCE IS NOT APPLICATION FOR LOAN

The invention should not be confused with existing systems which extend cash advances to a customer of an ATM. For example, banks provide checking accounts having overdraft protection. When a person writes a check which is not covered by funds, the overdraft protection adds funds to the account, and covers the check.

The overdraft protection can also be invoked at an ATM. A person can obtain currency from an ATM, by way of a cash advance under overdraft protection, even if the person's underlying account lacks sufficient funds to provide the currency.

There are at least two significant differences between such cash advances and the present invention. One is that, under the cash advance/overdraft protection approach, a "line of credit" has been previously approved. That is, the loan application has been previously processed, and approved. There is no loan application procedure, except in the possible sense that asking for a cash advance amounts to applying for a loan, which is, technically, incorrect in the present context.

The second reason is that, under the invention, no physical currency is actually delivered to the customer. Some reasons are the following:

One reason is that the amounts of money involved are so large that it is considered unwise for a person to carry them in public. Another is that technical difficulties exist in providing such large amounts of currency to customers using an ATM. For example, assume a loan of ten thousand dollars. If currency were to be delivered, large denominations, such as one-hundred dollar bills, or thousand-dollar bills, would be preferred. However, these large denominations are not generally desired by other customers of the ATM. Consequently, a stock of large-denomination bills must be held in the ATM, together with (possibly) additional dispensing equipment for the (mostly unused) large denominations.

A third reason is that storage of large amounts of currency within the ATMs presents a stocking problem (armored cars would be required to carry the currency, and load the ATMs) as well as a security problem: burglars would be tempted.

Therefore, the invention does not deliver currency to the customer. Instead, the invention credits the customer's account, or prepares a bank check for the customer.

4. INVENTION MAKES LOANS WHICH EXCEED THE CURRENCY CAPACITY OF ATM

One distinguishing feature of the invention over the cash advance approach is that the invention is capable of making loans which exceed the amount of currency stored within the ATM at which application for the loan is made. For example, an ATM may hold $50,000.00. The invention is capable of approving loans which exceed this value, and which, in general, are not related to, nor limited by, the storage capacity of the ATM.

Of course, once a loan is approved, and funds placed into a customer's account, it may be possible for the customer to withdraw physical currency from an ATM, but subject to normal ATM withdrawal limits.

Additional Considerations

1. The overall system conforms to IEEE (Institute of Electrical and Electronics Engineers) standards H.221, T.120, and H.320. The VISTIUM software generates a window on the SCREEN in FIG. 4 which conforms to CIF and QCIF standards.

Under the CIF standard, the transmitted video image occupies a window on the SCREENs of about 352 pixels horizontally, and 288 pixels vertically. (The QCIF uses a window in which each dimension is one-half that in CIF, providing one-fourth the area of CIF.) Two channels of ISDN transmission allow a transmission of 128 Kbits/sec. Of this data, 112K bits are used for video, and 16K for audio, providing a video rate of about 17 frames per second, using compression.

This rate provides substantially full-motion video, with synchronous audio. The video is not strictly pure full-motion video, because if extremely rapid motion of a subject within the video image occurs, then the full-motion becomes disrupted. However, disruption is expected to be rare, for two reasons. One, statistically speaking, such motion is expected to be infrequent in the types of video conferences under consideration.

Two, the conference participants will quickly learn that excessive, rapid motion will disrupt the video, and will naturally suppress such motion.

Therefore, the video can be described as substantially full-motion because (a) the video is, in fact, full-motion, if normal human movements are involved, and (b) the occurrences of rapid, disruptive motion, of the conference participants is expected to be minimal, or non-existent.

Based on the foregoing, as a minimum, the invention provides video conferencing at a minimum rate of 10 frames per second, with synchronous audio.

In contrast, normal telephone lines, such as those in 1986, when the Walker patent (discussed above) was filed, provide a maximum data rate of about 16 Kbits per second. The audio signal in a video conference requires about 4 Kbits per second, leaving a video data rate of about 12 Kbits per second. Thus, for a video window of comparable size to a CIF window, the frame rate for a normal telephone line must drop to about ten percent of the CIF rate, because the video data rate is about 12K, compared with 112K under the invention.

From another point of view, one particular video window used in the prior art is about 128×128 pixels in size. It is well known that, using an ordinary telephone line, a typical frame rate is in the range of 7 frames per second. If synchronous audio is also used, the frame rate drops to about 5 frames per second.

2. Important features of the VISTIUM PERSONAL VIDEO CONFERENCING SOFTWARE (earlier known as Telemedia Connection), as well as computer code which implements the remote conferencing features, are described in the following U.S. patent applications, which are hereby incorporated by reference.

"Remote Collaboration System," by Carleton, et al., Ser. No. 08/035,092, filed on Mar. 19, 1993.

"Remote Collaboration System," by Pommier, et al., Ser. No. 08/033,602, filed on Mar. 19, 1993.

Numerous substitutions and modifications can be undertaken without departing from the true spirit and scope of the invention. What is desired to be secured by Letters Patent is the invention as defined in the following claims.

We claim:

1. A video conferencing system of a financial institution comprising:

first and second automated teller machines (ATMs) separate from each other; and first and second video conferencing means associated with the first and second ATMs, respectively, and for enabling a person at one ATM to establish a video conference with another person at the other ATM.

2. A video conferencing system according to claim 1, further comprising (i) a workstation of the financial institution, and (ii) third video conferencing means associated with the workstation and for enabling a representative at the workstation to establish a video conference with the person at the first ATM or the person at the second ATM.

3. A video conferencing system according to claim 2, wherein each of the first and second video conferencing means includes video conferencing equipment which is located at the respective ATM.

4. A video conferencing system according to claim 3, wherein the third video conferencing means includes video conferencing equipment which is located at the workstation.

5. A video conferencing system according to claim 4, wherein the video conference comprises full-motion video imagery with synchronous audio.

\* \* \* \* \*